United States Patent
Yang

(10) Patent No.: US 11,974,317 B2
(45) Date of Patent: Apr. 30, 2024

(54) DATA TRANSMISSION METHOD AND APPARATUS, COMPUTER DEVICE, AND SYSTEM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 208 days.

(21) Appl. No.: 17/419,628

(22) PCT Filed: Jan. 4, 2019

(86) PCT No.: PCT/CN2019/070441
§ 371 (c)(1),
(2) Date: Jun. 29, 2021

(87) PCT Pub. No.: WO2020/140276
PCT Pub. Date: Jul. 9, 2020

(65) Prior Publication Data
US 2022/0086847 A1   Mar. 17, 2022

(51) Int. Cl.
*H04W 72/08* (2009.01)
*H04W 72/52* (2023.01)
*H04W 72/543* (2023.01)

(52) U.S. Cl.
CPC ........ *H04W 72/543* (2023.01); *H04W 72/52* (2023.01)

(58) Field of Classification Search
CPC ... H04W 24/10; H04W 72/52; H04W 72/543; H04W 76/23; H04W 88/06; H04W 92/18
See application file for complete search history.

(56) References Cited

U.S. PATENT DOCUMENTS

| 2018/0242190 | A1* | 8/2018 | Khoryaev | H04L 47/32 |
| 2019/0116519 | A1* | 4/2019 | Park | H04W 92/16 |
| 2019/0230572 | A1* | 7/2019 | Cheng | H04L 47/24 |
| 2019/0281511 | A1* | 9/2019 | Susitaival | H04W 36/0016 |

FOREIGN PATENT DOCUMENTS

| CN | 104782223 A | 7/2015 |
| CN | 104811892 A | 7/2015 |
| CN | 108886730 A | 11/2018 |

(Continued)

OTHER PUBLICATIONS

CN First Office Action in Application No. 201980000026.7, dated Sep. 8, 2021.

(Continued)

*Primary Examiner* — Mansour Oveissi
(74) *Attorney, Agent, or Firm* — Syncoda LLC; Feng Ma

(57) ABSTRACT

A data transmission method includes: sending a channel configuration message to a base station, the channel configuration message being used to indicate an access method set for one or more logical channels corresponding to a sidelink in the terminal; receiving a reconfiguration message sent by the base station, the reconfiguration message being used to indicate radio access methods corresponding to the logical channels; and sending the data in the logical channels on the sidelink according to corresponding radio access methods for the logical channels.

16 Claims, 5 Drawing Sheets

(56) References Cited

FOREIGN PATENT DOCUMENTS

| | | |
|---|---|---|
| CN | 109121214 A | 1/2019 |
| EP | 2723144 A1 * | 4/2014 ........... H04L 5/0032 |
| WO | 2018149265 A1 | 8/2018 |

OTHER PUBLICATIONS

International Search Report of PCT Application No. PCT/CN2019/070441 dated Jul. 24, 2019.
LG Electronics: R1-1810286 Consideration on enhancements of LTE Uu and NR Uu to control NR sidelink; 3GPP TSG RAN WG1 Meeting #94bis Chengdu, China, Oct. 8-12, 2018.

* cited by examiner

DATA TRANSMISSION METHOD AND APPARATUS, COMPUTER DEVICE, AND SYSTEM

CROSS-REFERENCE TO RELATED APPLICATION

This application is a national stage of International Application No. PCT/CN2019/070441 filed on Jan. 4, 2019, the disclosure of which is hereby incorporated by reference in its entirety.

TECHNICAL FIELD

Embodiments of the present disclosure relate to wireless communication technologies, and more particularly, to a data transmission method and device, a computer device and a system.

BACKGROUND

The sidelink technology is a near field communication technology in which terminals directly communicate information through a wireless interface between them.

With the continuous developments of wireless communication scenarios, a terminal can support a variety of different radio access methods. Correspondingly, the service data in the terminal can also be sent through a variety of different radio access methods. For example, some data in the terminal can be sent through the Long-Term Evolution (LTE) technology, and can also be sent through the New Radio (NR) technology. For the data in the terminal that can be sent through a variety of different radio access methods, there is currently no solution for selecting a suitable radio access method for the data.

SUMMARY

The present disclosure provides a data transmission method and device, a computer device and a system.

The technical solutions are as follows.

According to a first aspect of embodiments of the present disclosure, there is provided a data transmission method, including:
  sending, by a terminal, a channel configuration message to a base station, wherein the channel configuration message is used to indicate an access method set for one or more logical channels corresponding to a sidelink in the terminal, and the access method set comprises at least one radio access method supported by data corresponding to the logical channels;
  generating, by the base station, a reconfiguration message according to the channel configuration information and sending the reconfiguration message to the terminal, wherein the reconfiguration message is used to indicate radio access methods corresponding to the logical channels; and
  sending, by the terminal, the data in the logical channels on the sidelink according to corresponding radio access methods for the logical channels.

According to a second aspect of embodiments of the present disclosure, there is provided a data transmission method, the method being applied to a terminal and comprising:
  sending a channel configuration message to a base station, wherein the channel configuration message is used to indicate an access method set for one or more logical channels corresponding to a sidelink in the terminal, and the access method set comprises at least one radio access method supported by data corresponding to the logical channels;
  receiving a reconfiguration message sent by the base station, wherein the reconfiguration message is used to indicate radio access methods corresponding to the logical channels; and
  sending the data in the logical channels on the sidelink according to corresponding radio access methods for the logical channels.

According to some embodiments, the channel configuration message comprises the access method set for the logical channels, and the channel configuration message further comprises at least one of identities of the logical channels and Quality of Service (QoS) parameters of the data in the logical channels.

According to some embodiments, when the channel configuration message comprises the identities of the logical channels,
  the reconfiguration message comprises an identity of a target logical channel and a first radio access method corresponding to the target logical channel; the target logical channel is part or all of the logical channels, and the first radio access method is different from a second radio access method used by the terminal to send the channel configuration message.

According to some embodiments, sending the data in the logical channels on the sidelink according to corresponding radio access methods for the logical channels comprises:
  sending data in the target logical channel on the sidelink according to the first radio access method.

According to some embodiments, sending the data in the logical channels on the sidelink according to corresponding radio access methods for the logical channels further comprises:
  when there exists another logical channel, sending data in the other logical channel on the sidelink according to the second radio access method, wherein the other logical channel is a logical channel other than the target logical channel among the logical channels.

According to some embodiments, when the channel configuration message comprises the QoS of the data in the logical channels,
  the reconfiguration message comprises a target QoS and a third radio access method corresponding to the target QoS; the third radio access method is different from a second radio access method used by the terminal to send the channel configuration message.

According to some embodiments, sending the data in the logical channels on the sidelink according to corresponding radio access methods for the logical channels comprises:
  sending data in a logical channel corresponding to the target QoS among the logical channels on the sidelink according to the third radio access method.

According to some embodiments, sending the data in the logical channels on the sidelink according to corresponding radio access methods for the logical channels further comprises:
  when there exists another logical channel, sending data in the other logical channel on the sidelink according to the second radio access method; the other logical channel is a logical channel other than a logical channel corresponding to the target QoS among the logical channels.

According to some embodiments, when the second radio access method is Long-Term Evolution (LTE), the QoS is PPPP; and when the second radio access method is New Radio (NR), the QoS is 5QI.

According to some embodiments, when the second radio access method is Long-Term Evolution (LTE), the reconfiguration message is RRCConnectionReconfiguration; and when the second radio access method is New Radio (NR), the reconfiguration message is RRCReconfiguration.

According to some embodiments, the channel configuration message is sidelinkUEInformation.

According to some embodiments, before sending the channel configuration message to the base station, the method further comprises:

according to a radio access method supported by sidelink data to be sent, mapping the sidelink data to a first channel, wherein the first channel is any one of the logical channels, and when there are at least two pieces of data in the first channel, the at least two pieces of data correspond to at least one same radio access method; and obtaining a set formed by the same radio access method corresponding to each piece of data in the first channel as an access method set for the first channel.

According to a third aspect of embodiments of the present disclosure, there is provided a data transmission method, the method being applied to a base station and comprising:

receiving a channel configuration message sent from a terminal, wherein the channel configuration message is used to indicate an access method set for one or more logical channels corresponding to a sidelink in the terminal, and the access method set comprises at least one radio access method supported by data corresponding to the logical channels;

generating a reconfiguration message according to the channel configuration message, wherein the reconfiguration message is used to indicate radio access methods corresponding to the logical channels; and sending the reconfiguration message to the terminal.

According to some embodiments, generating the reconfiguration message according to the channel configuration message, comprises:

obtaining resource congestion information, wherein the resource congestion information is used to indicate resource congestion statuses for radio access methods corresponding to the sidelink; and generating the reconfiguration message according to the resource congestion information and the access method set for the one or more logical channels.

According to some embodiments, the channel configuration message comprises the access method set for the logical channels, and the channel configuration message further comprises at least one of identities of the logical channels and Quality of Service (QoS) parameters of the data in the logical channels.

According to some embodiments, when the channel configuration message comprises the identities of the logical channels, the reconfiguration message comprises an identity of a target logical channel and a first radio access method corresponding to the target logical channel; the target logical channel is part or all of the logical channels, and the first radio access method is different from a second radio access method used by the terminal to send the channel configuration message.

According to some embodiments, when the channel configuration message comprises the QoS of the data in the logical channels, the reconfiguration message comprises a target QoS and a third radio access method corresponding to the target QoS; the third radio access method is different from a second radio access method used by the terminal to send the channel configuration message.

According to some embodiments, when the second radio access method is Long-Term Evolution (LTE), the QoS is PPPP; and when the second radio access method is New Radio (NR), the QoS is 5QI.

According to some embodiments, when the second radio access method is Long-Term Evolution (LTE), the reconfiguration message is RRCConnectionReconfiguration; and when the second radio access method is New Radio (NR), the reconfiguration message is RRCReconfiguration.

According to some embodiments, the channel configuration message is sidelinkUEInformation.

According to a fourth aspect of embodiments of the present disclosure, there is provided a data transmission device, the device being applied to a terminal and comprising:

a configuration message sending module configured to send a channel configuration message to a base station, wherein the channel configuration message is used to indicate an access method set for one or more logical channels corresponding to a sidelink in the terminal, and the access method set comprises at least one radio access method supported by data corresponding to the logical channels;

a reconfiguration message receiving module configured to receive a reconfiguration message sent by the base station, wherein the reconfiguration message is used to indicate radio access methods corresponding to the logical channels; and a data sending module configured to send the data in the logical channels on the sidelink according to corresponding radio access methods for the logical channels.

According to some embodiments, the channel configuration message comprises the access method set for the logical channels, and the channel configuration message further comprises at least one of identities of the logical channels and Quality of Service (QoS) parameters of the data in the logical channels.

According to some embodiments, when the channel configuration message comprises the identities of the logical channels, the reconfiguration message comprises an identity of a target logical channel and a first radio access method corresponding to the target logical channel; the target logical channel is part or all of the logical channels, and the first radio access method is different from a second radio access method used by the terminal to send the channel configuration message.

According to some embodiments, the data sending module is configured to:

send data in the target logical channel on the sidelink according to the first radio access method.

According to some embodiments, the data sending module is further configured to:

when there exists another logical channel, send data in the other logical channel on the sidelink according to the second radio access method, wherein the other logical channel is a logical channel other than the target logical channel among the logical channels.

According to some embodiments, when the channel configuration message comprises the QoS of the data in the logical channels,
the reconfiguration message comprises a target QoS and a third radio access method corresponding to the target QoS; the third radio access method is different from a second radio access method used by the terminal to send the channel configuration message.

According to some embodiments, the data sending module is configured to:
send data in a logical channel corresponding to the target QoS among the logical channels on the sidelink according to the third radio access method.

According to some embodiments, the data sending module is further configured to:
when there exists another logical channel, sending data in the other logical channel on the sidelink according to the second radio access method; the other logical channel is a logical channel other than a logical channel corresponding to the target QoS among the logical channels.

According to some embodiments, when the second radio access method is Long-Term Evolution (LTE), the QoS is PPPP; and
when the second radio access method is New Radio (NR), the QoS is 5QI.

According to some embodiments, when the second radio access method is Long-Term Evolution (LTE), the reconfiguration message is RRCConnectionReconfiguration; and
when the second radio access method is New Radio (NR), the reconfiguration message is RRCReconfiguration.

According to some embodiments, the channel configuration message is sidelinkUEInformation.

According to some embodiments, the device further includes:
a mapping module configured to, before the channel configuration message sending module sends the channel configuration message to the base station, map sidelink data to be sent to a first channel according to a radio access method supported by the sidelink data to be sent, wherein the first channel is any one of the logical channels, and when there are at least two pieces of data in the first channel, the at least two pieces of data correspond to at least one same radio access method; and
a set obtaining module configured to obtain a set formed by the same radio access method corresponding to each piece of data in the first channel as an access method set for the first channel.

According to a fifth aspect of embodiments of the present disclosure, there is provided a data transmission device, the device being applied to a base station and comprising:
a configuration message receiving module configured to receive a channel configuration message sent from a terminal, wherein the channel configuration message is used to indicate an access method set for one or more logical channels corresponding to a sidelink in the terminal, and the access method set comprises at least one radio access method supported by data corresponding to the logical channels;
a reconfiguration message generation module configured to generate a reconfiguration message according to the channel configuration message, wherein the reconfiguration message is used to indicate radio access methods corresponding to the logical channels; and
a reconfiguration message sending module configured to send the reconfiguration message to the terminal.

According to some embodiments, the reconfiguration message generation module is configured to:
obtain resource congestion information, wherein the resource congestion information is used to indicate resource congestion statuses for radio access methods corresponding to the sidelink; and
generate the reconfiguration message according to the resource congestion information and the access method set for the one or more logical channels.

According to some embodiments, the channel configuration message comprises the access method set for the logical channels, and the channel configuration message further comprises at least one of identities of the logical channels and Quality of Service (QoS) parameters of the data in the logical channels.

According to some embodiments, when the channel configuration message comprises the identities of the logical channels,
the reconfiguration message comprises an identity of a target logical channel and a first radio access method corresponding to the target logical channel; the target logical channel is part or all of the logical channels, and the first radio access method is different from a second radio access method used by the terminal to send the channel configuration message.

According to some embodiments, when the channel configuration message comprises the QoS of the data in the logical channels,
the reconfiguration message comprises a target QoS and a third radio access method corresponding to the target QoS; the third radio access method is different from a second radio access method used by the terminal to send the channel configuration message.

According to some embodiments, when the second radio access method is Long-Term Evolution (LTE), the QoS is PPPP; and
when the second radio access method is New Radio (NR), the QoS is 5QI.

According to some embodiments, when the second radio access method is Long-Term Evolution (LTE), the reconfiguration message is RRCConnectionReconfiguration; and
when the second radio access method is New Radio (NR), the reconfiguration message is RRCReconfiguration.

According to some embodiments, the channel configuration message is sidelinkUEInformation.

According to a sixth aspect of embodiments of the present disclosure, there is provided a data transmission device, the device being applied to a terminal and comprising:
a processor; and
a memory for storing instructions executable by the processor;
wherein the processor is configured to:
send a channel configuration message to a base station, wherein the channel configuration message is used to indicate an access method set for one or more logical channels corresponding to a sidelink in the terminal, and the access method set comprises at least one radio access method supported by data corresponding to the logical channels;
receive a reconfiguration message sent by the base station, wherein the reconfiguration message is used to indicate radio access methods corresponding to the logical channels; and
send the data in the logical channels on the sidelink according to corresponding radio access methods for the logical channels.

According to a seventh aspect of embodiments of the present disclosure, there is provided a data transmission device, the device being applied to a base station and comprising:
   a processor; and
   a memory for storing instructions executable by the processor;
   wherein the processor is configured to:
   receive a channel configuration message sent from a terminal, wherein the channel configuration message is used to indicate an access method set for one or more logical channels corresponding to a sidelink in the terminal, and the access method set comprises at least one radio access method supported by data corresponding to the logical channels;
   generate a reconfiguration message according to the channel configuration message, wherein the reconfiguration message is used to indicate radio access methods corresponding to the logical channels; and
   send the reconfiguration message to the terminal.

According to an eighth aspect of embodiments of the present disclosure, there is provided a computer-readable storage medium having stored therein executable instructions that, when called by a processor of a second Internet of Vehicles device, cause the second Internet of Vehicles device to perform the data transmission method according to the second aspect or any implementation of the second aspect.

According to a ninth aspect of embodiments of the present disclosure, there is provided a computer-readable storage medium having stored therein executable instructions that, when called by a processor of a first Internet of Vehicles device, cause the first Internet of Vehicles device to perform the data transmission method according to the third aspect or any implementation of the third aspect.

The technical solutions according to embodiments of the present disclosure have the following advantageous effects:

A terminal device reports to a base station radio access methods which data in logical channels corresponding to a sidelink can support. According to the reported information, a base station configures a radio access method for the data which support multiple radio access methods, and notifies the terminal of the configuration result by a reconfiguration message. According to the configuration result, the terminal can direct the sidelink data which support multiple radio access methods to the radio access method as configured by the base station to transmit the data. In this way, when performing sidelink data transmission, the radio access methods for the data transmission can be selected.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Figure 1:
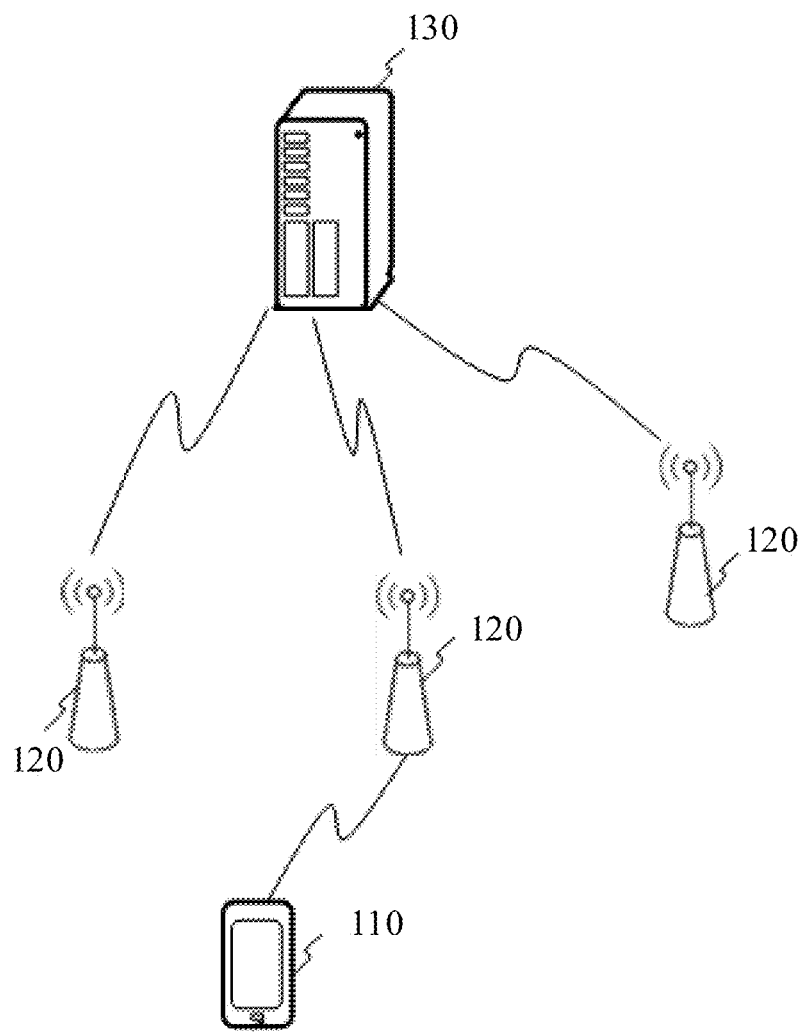
FIG. 1 is a schematic diagram showing an implementation environment involved in a data transmission method according to some exemplary embodiments.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

It should be understood that "some" mentioned herein refers to one or more, and "a plurality of" refers to two or more. The term "and/or" describes an association relationship of the associated objects, indicating that there can be three types of relationships, for example, A and/or B can mean: A alone, B alone, and A and B together. The character "/" generally indicates that the associated objects before and after "/" are in an "or" relationship.

In the 4th generation mobile communication (4 G) system, that is, the Long-Term Evolution (LTE) system, there are two resource allocation methods on sidelink. One is a network dynamic scheduling method, and the other one is a method in which terminals autonomously select resources in a resource pool. In the dynamic scheduling method, a base station on the network side dynamically allocates transmission resources on the sidelink for terminals according to buffer data report information of the terminals. In the autonomous selection method, terminals randomly select transmission resources from a resource pool which is broadcast by the network or is pre-configured. The resource pool in the dynamic scheduling mode and the resource pool in the autonomous selection mode are separated. The base station allocates resources uniformly in the dynamic scheduling, and thus a reasonable algorithm can be used to avoid collisions between data sent by different terminals.

For transmission in the autonomous selection method, a cell can broadcast SIB18, 19, 21, 26 and other information, which can carry the sidelink resource pool configuration in the cell. Accordingly, terminals in an idle state can read the broadcast information to obtain radio resources available for transmission and reception on the sidelink. Resource pools for different application scenarios can be configured independently. For example, for V2V (vehicle to vehicle) communication in vehicle to everything (V2X) communication, V2I (vehicle to infrastructure) communication, and V2P (vehicle to pedestrian) communication or other scenarios, different sidelink resource pools can be configured. The sidelink resource pool configuration can be one sidelink resource pool or a list of multiple sidelink resource pools.

Before sending data on the sidelink, a terminal detects the transmission energy on the sidelink to obtain the Channel Busy Ratio (CBR) of a certain transmission resource pool. This parameter reflects an occupancy situation of resources in the transmission resource pool. The terminal can select resources in the resource pool with a relatively low CBR to send sidelink data.

In the LTE system, the priority of sidelink data is indicated by Prose Per Packet Priority (PPPP). The sending resource pool can be bound (or associated) to PPPP, that is, a certain resource pool can only be used to send data of a certain PPPP. In this way, the collision probability of high-priority data can be reduced.

In the LTE system, a terminal can send sidelink auxiliary information to the network through the sidelinkUEInformation message, including a destination identifier and whether the terminal is interested in the sidelink sending/receiving.

In the 5G NR (New Radio) system, the Quality of Service (QoS) of sidelink data is indicated by the 5G QoS Identifier (5QI). 5QI indicates the priority of data, time delay, bit error rate or other requirements.

The Application (APP) layer can indicate which sidelink radio access technology type is required for sidelink data. This indication can be: LTE only, NR only, or both LTE and NR can be used.

Because there are multiple sidelink radio access technologies, including LTE and NR. For sidelink data that can be transmitted using any of the above two radio access technologies, it is needed to select a sidelink radio access technology. However, in related arts, there is a lack of related sidelink radio access technology selection mechanisms.

The present disclosure designs various embodiments, and shows methods for data transmission over sidelink, which can realize the selection of the radio access technology used for data transmission over sidelink.

FIG. 1 is a schematic diagram showing an implementation environment involved in a data transmission method according to some exemplary embodiments. As shown in FIG. 1, the implementation environment may include several terminals 110 and base stations 120.

The terminals 110 may be wireless communication devices that support multiple radio access technologies for sidelink transmissions. For example, the terminals 110 may support cellular mobile communication technologies. For example, the terminals may support the 4th generation (4G) mobile communication technology and the 5G technology. Alternatively, the terminals 110 may support a next-generation mobile communication technology of the 5G technology.

For example, the terminals 110 may be vehicle-mounted communication devices. For example, the terminals 110 may be car computers with a wireless communication function, or wireless communication devices connected to a car computer.

Alternatively, the terminals 110 may be roadside devices. For example, the terminals 110 may be street lamps, signal lamps or other roadside devices with a wireless communication function.

Alternatively, the terminals 110 may be user terminal devices, such as mobile phones (or called "cellular" phones) or computers with a mobile terminal. For example, the terminals 110 may be portable, pocket-sized, handheld, built-in computer or vehicle-mounted mobile devices. For some other examples, the terminals 110 may be stations (STAs), subscriber units, subscriber stations, mobile stations, mobiles, remote stations, access points, remote terminals, access terminals, user terminals, user agents, user devices, or user equipment (UEs). For example, the terminals 110 may be mobile terminals such as smart phones, tablet computers, or e-book readers, or may be smart wearable devices such as smart glasses, smart watches, or smart bracelets.

The base stations 120 may be network side devices in a wireless communication system. The wireless communication system may be the 4th generation mobile communication (4G) system, also known as the Long-Term Evolution (LTE) system; or, the wireless communication system may be a 5G system, also known as the New Radio (NR) system. Alternatively, the wireless communication system may be a next-generation system of the 5G system.

The base stations 120 may be evolved base stations (eNB) used in the 4G system. Alternatively, the base stations 120 may be base stations (gNB) adopting a centralized and distributed architecture in the 5G system. When the base stations 120 adopt the centralized and distributed architecture, each of the base stations 120 usually includes a centralized unit (CU) and at least two distributed units (DU). The centralized unit is provided with a Packet Data Convergence Protocol (PDCP) layer, a Radio Link Control (RLC) layer, and a Media Access Control (MAC) layer of a protocol stack. The distributed units are provided with a physical (Physical, PHY) layer of a protocol stack. Embodiments of the present disclosure do impose specific limitations on the specific implementations of the base stations 120.

Wireless connections can be established between the base stations 120 and the terminals 110 through a wireless air interface. In different embodiments, the wireless air interface is a wireless air interface based on the fourth-generation mobile communication network technology (4G) standards; or, the wireless air interface is a wireless air interface based on the fifth-generation mobile communication network technology (5G) standards. For example, the wireless air interface is a new air interface; or, the wireless air interface may be a wireless air interface based on technology standards of a next-generation mobile communication network which is more advanced than 5G.

According to some embodiments, the foregoing wireless communication system may further include a network management device 130.

Several base stations 120 are connected to the network management device 130. The network management device 130 may be a core network device in the wireless communication system. For example, the network management device 130 may be a Mobility Management Entity (MME) in an Evolved Packet Core (EPC). Alternatively, the network management device may be other core network devices, such as a Serving GateWay (SGW), a Public Data Network GateWay (PGW), or a Policy and Charging Rules Function (PCRF) or a Home Subscriber Server (HSS), etc. The implementation of the network management device 130 is not limited in embodiments of the present disclosure.

Figure 2:
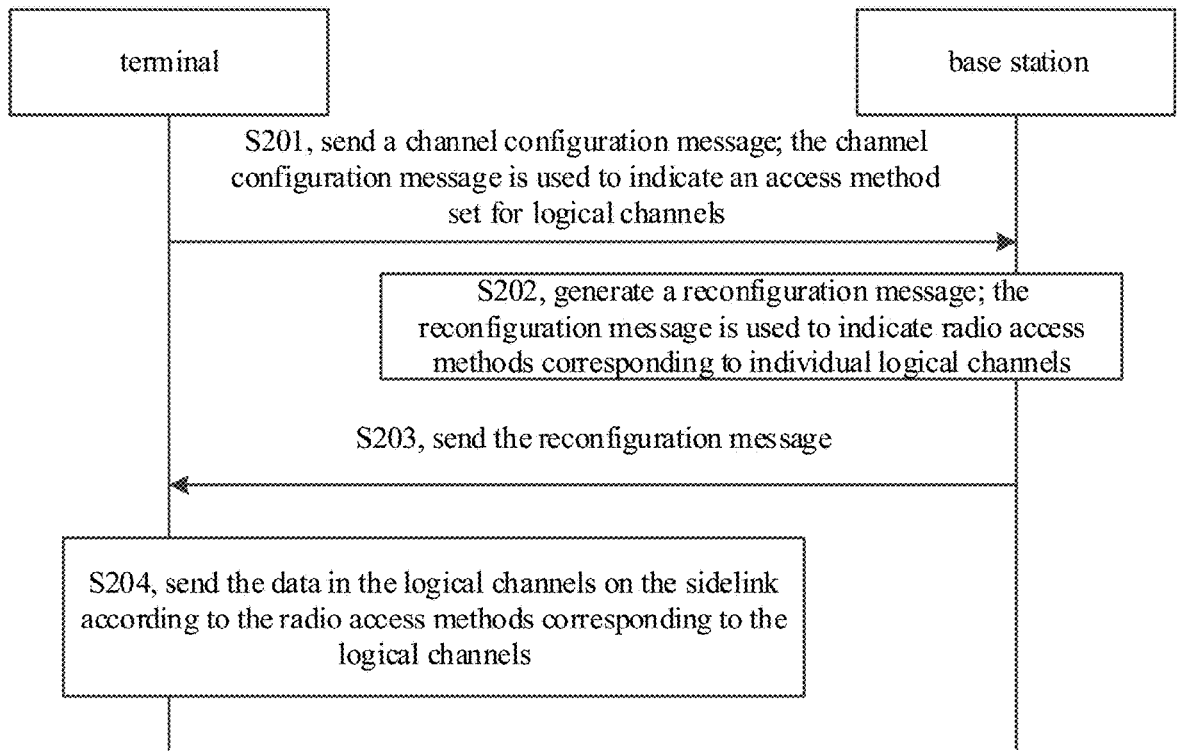
FIG. 2 is a flow chart showing a data transmission method according to an exemplary embodiment.

FIG. 2 is a flowchart showing a data transmission method according to an exemplary embodiment. As shown in FIG. 2, the data transmission method is applied to the implementation environment shown in IG. 1, and the method may include the following steps.

In step 201, a terminal sends a channel configuration message to a base station. The channel configuration message is used to indicate an access method set for one or more logical channels corresponding to a sidelink in the terminal. Accordingly, the base station receives the channel configuration information.

The access method set includes at least one radio access method supported by data corresponding to the logical channels.

In embodiments of the present disclosure, when the terminal maps sidelink data to a logical channel, the terminal can avoid mapping data corresponding to different sidelink radio access technologies to the same logical channel.

For example, the radio access methods supported by the terminal include LTE and NR. For sidelink data that can only be sent through LTE, the terminal maps the data to logical channel 1. For sidelink data that can only be sent through NR, the terminal maps the data to logical channel 2. For sidelink data that can be sent through LTE and can also be sent through NR, the terminal maps the data to logical channel 3.

In step 202, the base station generates a reconfiguration message according to the channel configuration message. The reconfiguration message is used to indicate radio access methods corresponding to individual logical channels.

In embodiments of the present disclosure, the base station can generate the reconfiguration message by taking the channel configuration message and the sidelink resource congestion conditions corresponding to different radio access technologies into consideration.

In a wireless communication system where multiple radio access technologies coexist, the congestion of sidelink resources corresponding to different radio access technologies may be uneven. For example, in a wireless communication system where LTE and NR coexist, resources in the sidelink resource pool corresponding to LTE may be occupied for a long time, and resource congestion is relatively serious. At the same time, the resources in the sidelink resource pool corresponding to NR may be idle for a long time, and the resource congestion is not serious. In the solutions shown in embodiments of the present disclosure, the base station can offload the sidelink data that supports both LTE and NR to the NR according to the congestion of resources in the sidelink resource pools corresponding to LTE and NR respectively, and generate corresponding reconfiguration messages accordingly.

In step 203, the base station sends the reconfiguration message to the terminal. Correspondingly, the terminal receives the reconfiguration message.

In step 204, the terminal sends the data in the logical channels on the sidelink according to the radio access methods corresponding to the logical channels.

After the terminal receives the reconfiguration message, the terminal, with the logical channel as the smallest granularity, directs the to-be-sent sidelink data that supports multiple radio access methods to the radio access methods indicated by the reconfiguration message and sends the data.

The solutions shown in the above-mentioned embodiments of the present disclosure are described by taking multiple radio access technologies including LTE and NR as examples. In addition to LTE and NR, the above-mentioned multiple radio access technologies may include other radio access technologies. For example, the multiple radio access technologies can also include a next-generation radio access technology after NR.

In view of the above, in the technical solutions according to embodiments of the present disclosure, a terminal device reports to a base station radio access methods which data in logical channels corresponding to a sidelink can support. According to the reported information, a base station configures a radio access method for the data which support multiple radio access methods, and notifies the terminal of the configuration result by a reconfiguration message. According to the configuration result, the terminal can direct the sidelink data which support multiple radio access methods to the radio access method as configured by the base station to transmit the data. In this way, when performing sidelink data transmission, the radio access methods for the data transmission can be selected.

Figure 3:
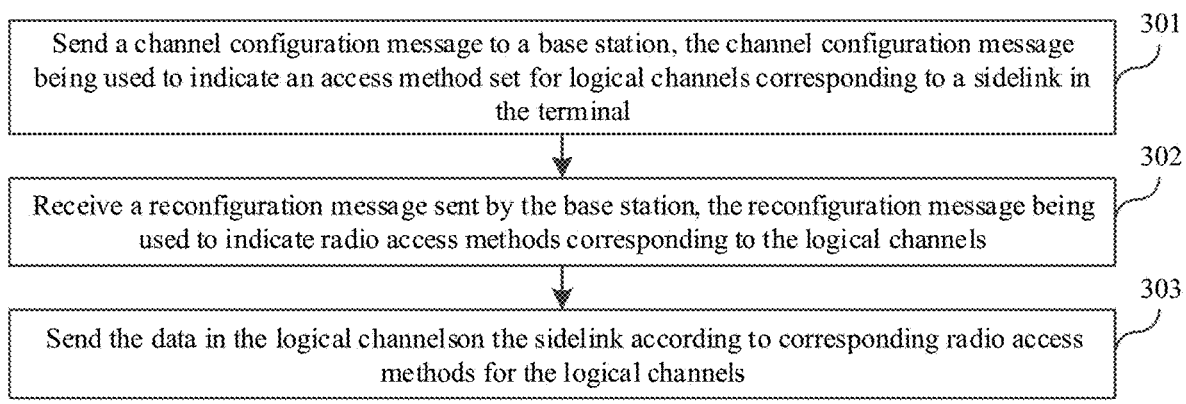
FIG. 3 is a flow chart showing a data transmission method according to an exemplary embodiment.

FIG. 3 is a flow chart showing a data transmission method according to an exemplary embodiment. The method may be performed by the terminal in the embodiment shown in FIG. 2, and the method may include the following steps.

In step 301, a channel configuration message is sent to a base station. The channel configuration message is used to indicate an access method set for one or more logical channels corresponding to a sidelink in the terminal, and the access method set comprises at least one radio access method supported by data corresponding to the logical channels.

In step 302, a reconfiguration message sent by the base station is received. The reconfiguration message is used to indicate radio access methods corresponding to the logical channels.

In step 303, the data in the logical channels is sent on the sidelink according to corresponding radio access methods for the logical channels.

According to some embodiments, the channel configuration message comprises the access method set for the logical channels, and the channel configuration message further comprises at least one of identities of the logical channels and Quality of Service (QoS) parameters of the data in the logical channels.

According to some embodiments, when the channel configuration message comprises the identities of the logical channels, the reconfiguration message comprises an identity of a target logical channel and a first radio access method corresponding to the target logical channel; the target logical channel is part or all of the logical channels, and the first radio access method is different from a second radio access method used by the terminal to send the channel configuration message.

According to some embodiments, sending the data in the logical channels on the sidelink according to corresponding radio access methods for the logical channels comprises:
  sending data in the target logical channel on the sidelink according to the first radio access method.

According to some embodiments, sending the data in the logical channels on the sidelink according to corresponding radio access methods for the logical channels further comprises:
  when there exists another logical channel, sending data in the other logical channel on the sidelink according to the second radio access method, wherein the other logical channel is a logical channel other than the target logical channel among the logical channels.

According to some embodiments, when the channel configuration message comprises the QoS of the data in the logical channels,
  the reconfiguration message comprises a target QoS and a third radio access method corresponding to the target QoS; the third radio access method is different from a second radio access method used by the terminal to send the channel configuration message.

According to some embodiments, sending the data in the logical channels on the sidelink according to corresponding radio access methods for the logical channels comprises:
  sending data in a logical channel corresponding to the target QoS among the logical channels on the sidelink according to the third radio access method.

According to some embodiments, sending the data in the logical channels on the sidelink according to corresponding radio access methods for the logical channels further comprises:

when there exists another logical channel, sending data in the other logical channel on the sidelink according to the second radio access method; the other logical channel is a logical channel other than a logical channel corresponding to the target QoS among the logical channels.

According to some embodiments, when the second radio access method is Long-Term Evolution (LTE), the QoS is Prose Per Packet Priority (PPPP); and when the second radio access method is New Radio (NR), the QoS is 5G QoS Identifier (5QI).

According to some embodiments, when the second radio access method is Long-Term Evolution (LTE), the reconfiguration message is RRCConnectionReconfiguration; and when the second radio access method is New Radio (NR), the reconfiguration message is RRCReconfiguration.

According to some embodiments, the channel configuration information is sidelinkUEInformation.

According to some embodiments, before sending the channel configuration message to the base station, the method further comprises:

according to a radio access method supported by sidelink data to be sent, mapping the sidelink data to a first channel, wherein the first channel is any one of the logical channels, and when there are at least two pieces of data in the first channel, the at least two pieces of data correspond to at least one same radio access method; and obtaining a set formed by the same radio access method corresponding to each piece of data in the first channel as an access method set for the first channel.

In view of the above, in the technical solutions according to embodiments of the present disclosure, a terminal device reports to a base station radio access methods which data in logical channels corresponding to a sidelink can support. According to the reported information, a base station configures a radio access method for the data which support multiple radio access methods, and notifies the terminal of the configuration result by a reconfiguration message. According to the configuration result, the terminal can direct the sidelink data which support multiple radio access methods to the radio access method as configured by the base station to transmit the data. In this way, when performing sidelink data transmission, the radio access method for the data transmission can be selected.

Figure 4:
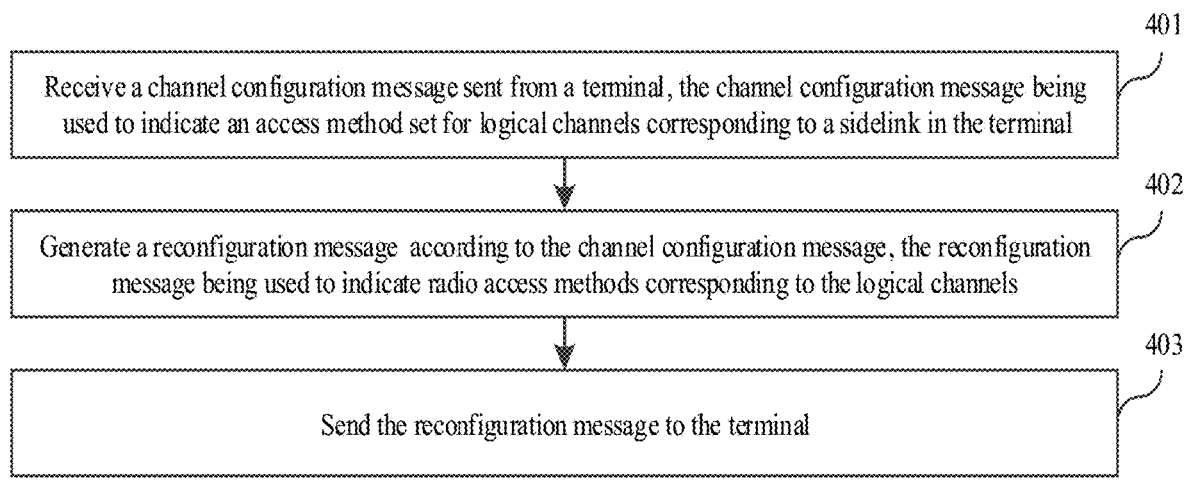
FIG. 4 is a flow chart showing a data transmission method according to an exemplary embodiment.

FIG. 4 is a flow chart showing a data transmission method according to an exemplary embodiment. The method may be performed by the base station in the embodiment shown in FIG. 2, and the method may include the following steps.

In step 401, a channel configuration message sent from a terminal is received. The channel configuration message is used to indicate an access method set for one or more logical channels corresponding to a sidelink in the terminal, and the access method set comprises at least one radio access method supported by data corresponding to the logical channels.

In step 402, a reconfiguration message is generated according to the channel configuration message. The reconfiguration message is used to indicate radio access methods corresponding to the logical channels.

In step 403, the reconfiguration message is sent to the terminal, so that the terminal sends the data in each logical channel on the sidelink according to the radio access method corresponding to each logical channel.

According to some embodiments, generating the reconfiguration message according to the channel configuration message, comprises:

obtaining resource congestion information, wherein the resource congestion information is used to indicate resource congestion statuses for radio access methods corresponding to the sidelink; and generating the reconfiguration message according to the resource congestion information and the access method set for the one or more logical channels.

According to some embodiments, the channel configuration message comprises the access method set for the logical channels, and the channel configuration message further comprises at least one of identities of the logical channels and Quality of Service (QoS) parameters of the data in the logical channels.

According to some embodiments, when the channel configuration message comprises the identities of the logical channels, the reconfiguration message comprises an identity of a target logical channel and a first radio access method corresponding to the target logical channel; the target logical channel is part or all of the logical channels, and the first radio access method is different from a second radio access method used by the terminal to send the channel configuration message.

According to some embodiments, when the channel configuration message comprises the QoS of the data in the logical channels, the reconfiguration message comprises a target QoS and a third radio access method corresponding to the target QoS; the third radio access method is different from a second radio access method used by the terminal to send the channel configuration message.

According to some embodiments, when the second radio access method is Long-Term Evolution (LTE), the QoS is PPPP; and when the second radio access method is New Radio (NR), the QoS is 5QI.

According to some embodiments, when the second radio access method is Long-Term Evolution (LTE), the reconfiguration message is RRCConnectionReconfiguration; and when the second radio access method is New Radio (NR), the reconfiguration message is RRCReconfiguration.

According to some embodiments, the channel configuration message is sidelinkUEInformation.

In view of the above, in the technical solutions according to embodiments of the present disclosure, a terminal device reports to a base station radio access methods which data in logical channels corresponding to a sidelink can support. According to the reported information, a base station configures a radio access method for the data which support multiple radio access methods, and notifies the terminal of the configuration result by a reconfiguration message. According to the configuration result, the terminal can direct the sidelink data which support multiple radio access methods to the radio access method as configured by the base station to transmit the data. In this way, when performing sidelink data transmission, the radio access method for the data transmission can be selected.

Figure 5:
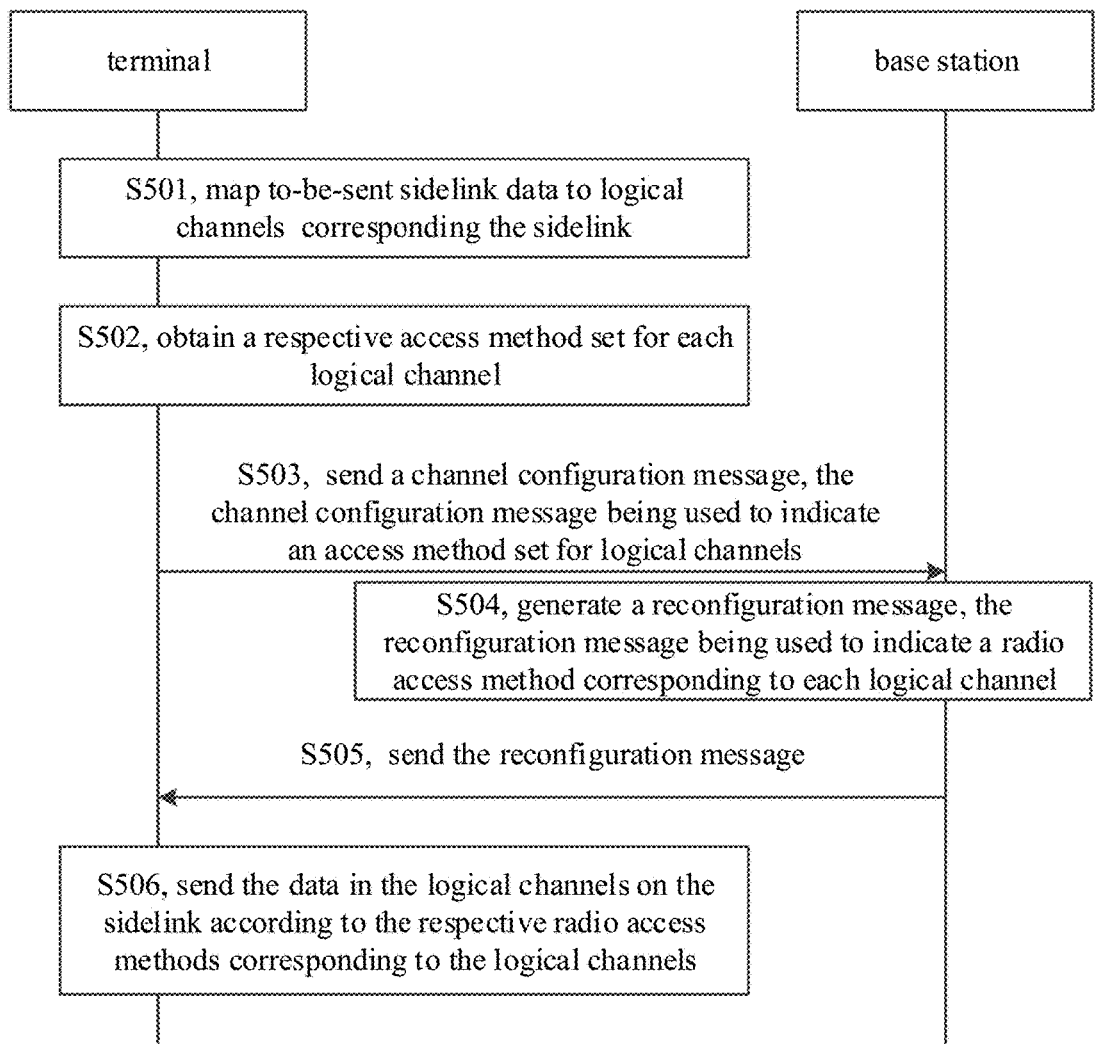
FIG. 5 is a flowchart showing a data transmission method according to an exemplary embodiment.

FIG. 5 is a flow chart showing a data transmission method according to an exemplary embodiment. As shown in FIG. 5, the data transmission method is applied in the implementation environment shown in FIG. 1, and the method may include the following steps.

In step 501, a terminal maps to-be-sent sidelink data to logical channels corresponding the sidelink.

In embodiments of the present disclosure, when the terminal maps sidelink data to logical channels, the terminal can avoid mapping data corresponding to different sidelink radio access technologies to the same logical channel.

In step 502, the terminal obtains a respective access method set for each logical channel. The access method set includes at least one radio access method supported by the data in the corresponding logical channel.

For example, in embodiments of the present disclosure, the terminal can map the to-be-sent sidelink data to a first channel according to a radio access method supported by the sidelink data. The first channel is any channel among the logical channels. When there exist at least two pieces of data in the first channel, the at least two pieces of data correspond to at least one same radio access method. When obtaining the access method set for the first channel, the terminal may obtain a set formed by the same radio access method(s) corresponding to each piece of data in the first channel as the access method set for the first channel.

As an example, the radio access methods supported by the terminal include LTE and NR, and the logical channels corresponding to the sidelink in the terminal include logical channel 1, logical channel 2, and logical channel 3. The radio access method supported by each piece of data in logical channel 1 is LTE, the radio access method supported by each piece of data in logical channel 2 is NR, and the radio access method supported by each piece of data in logical channel 3 is LTE and NR. The terminal obtains the access method set corresponding to logical channel 1 as {LTE}, obtains the access method set corresponding to logical channel 2 as {NR}, and obtains the access method set corresponding to logical channel 3 as {LTE, NR}.

In step 503, the terminal sends a channel configuration message to the base station. The channel configuration message is used to indicate an access method set for one or more logical channels corresponding to a sidelink in the terminal. Accordingly, the base station receives the channel configuration message.

In embodiments of the present disclosure, the terminal may generate the aforementioned channel configuration message according to the obtained access method set for each logical channel.

According to some embodiments, when generating the channel configuration message, the terminal may generate a channel configuration message which indicates an access method set for a part of the logical channels which include at least two radio access methods among the logical channels. For example, the access method set corresponding to logical channel 1 is obtained as {LTE}, the access method set corresponding to logical channel 2 is obtained as {NR}, and the access method set corresponding to logical channel 3 is obtained as {LTE, NR}. The channel configuration message generated by the terminal can only be used to indicate that the access method set corresponding to logical channel 3 is {LTE, NR}.

According to some other embodiments, when generating the channel configuration message, the terminal may generate a channel configuration message which indicate access method sets for individual logical channels. For example, the access method set corresponding to logical channel 1 is obtained as {LTE}, the access method set corresponding to logical channel 2 is obtained as {NR}, and the access method set corresponding to logical channel 3 is obtained as {LTE, NR}. The channel configuration message generated by the terminal can be used to indicate that the access method set corresponding to logical channel 3 is {LTE, NR}, and can also be used to indicate that the access method set corresponding to logical channel 1 is {LTE} and the access method set corresponding to logical channel 2 is {NR}.

In addition to the access method set for each logical channel, the above-mentioned channel configuration message may also include at least one of an identity of each logical channel and a Quality of Service (QoS) parameter of the data in each logical channel.

For example, in a possible implementation, the channel configuration message includes the access method set for each logical channel and an identity list including identities of individual logical channels.

Or, in another possible implementation, the channel configuration message includes the access method set for each logical channel and the QoS of each logical channel.

Or, in another possible implementation, the channel configuration message includes the access method set for each logical channel, the identity list including identities of individual logical channels, and the QoS of each logical channel.

In embodiments of the present disclosure, the terminal may reuse existing signaling to send the channel configuration message to the base station. For example, the channel configuration message may be sidelinkUEInformation sent to the base station after the terminal receives a broadcast message sent by the base station.

Alternatively, in embodiments of the present disclosure, the terminal may send the channel configuration message to the base station through an independent signaling.

According to some embodiments, the specific form of the QoS of each logical channel may be related to a second radio access method used by the terminal to send the channel configuration message to the base station. For example, when the second radio access method is LTE, the QoS of each logical channel is PPPP of each logical channel used in the LTE system; and, when the second radio access method is NR, the QoS of each logical channel is 5QI of each logical channel used in the NR system.

In step 504, the base station generates a reconfiguration message according to the channel configuration message. The reconfiguration message is used to indicate a radio access method corresponding to each logical channel.

In embodiments of the present disclosure, the base station can obtain resource congestion information after receiving the channel configuration message sent by the terminal. The resource congestion information is used to indicate the resource congestion conditions of various radio access methods corresponding to the sidelink. According to the resource congestion information and the access method sets for the one or more logical channels, the base station generates the reconfiguration message.

For the generation of the reconfiguration message by the base station according to the resource congestion information and the access method sets for the one or more logical channels, details can be found in the previous description regarding step 202 in the embodiment shown in FIG. 2, and repeated description is omitted here.

According to some embodiments, generating the reconfiguration message according to the resource congestion information and the access method sets for the one or more logical channels may include: generating the reconfiguration message according to the resource congestion information, the access method set for the one or more logical channels, and the QoS parameter (i.e., PPPP or 5QI) of the data in each logical channel.

The contents contained in the reconfiguration message can be as follows:

1) When the channel configuration message comprises the identities of the logical channels, the reconfiguration message comprises an identity of a target logical channel and a first radio access method corresponding to the target logical channel; the target logical channel is part or all of the logical channels, and the first radio access method is different from a second radio access method used by the terminal to send the channel configuration message.

For example, the access method set corresponding to logical channel 1 is {LTE}, the access method set corresponding to logical channel 2 is {NR}, and the access method set corresponding to logical channel 3 is {LTE, NR}. Assuming that the second radio access method is LTE and the base station determines that the radio access method for logical channel 3 is NR, when the channel configuration message includes the identity of each logical channel, the reconfiguration message includes the identity of logical channel 2, the radio access method (NR) corresponding to logical channel 2, the identity of logical channel 3, and the radio access method (NR) corresponding to logical channel 3.

2) When the channel configuration message comprises identities of the logical channels, the reconfiguration message includes the identity of each logical channel and the radio access method corresponding to each logical channel.

For example, the access method set corresponding to logical channel 1 is {LTE}, the access method set corresponding to logical channel 2 is {NR}, and the access method set corresponding to logical channel 3 is {LTE, NR}. Assuming that the second radio access method is LTE and the base station determines that the radio access method for logical channel 3 is NR, when the channel configuration message includes the identities of the logical channels, the reconfiguration message includes the identity of the logical channel 1, the radio access method (LTE) corresponding to logical channel 1, the identity of logical channel 2, the radio access method (NR) corresponding to logical channel 2, the identity of logical channel 3, and the radio access method corresponding to logical channel 3 (NR).

3) When the channel configuration message comprises the QoS of the data in the logical channels, the reconfiguration message comprises a target QoS and a third radio access method corresponding to the target QoS; the third radio access method is different from a second radio access method used by the terminal to send the channel configuration message.

For example, the access method set corresponding to logical channel 1 is {LTE}, the access method set corresponding to logical channel 2 is {NR}, and the access method set corresponding to logical channel 3 is {LTE, NR}. Assuming that the QoS parameter corresponding to logical channel 1 is QoS parameter 1, the QoS parameter corresponding to logical channel 2 is QoS parameter 2, and the QoS parameter corresponding to logical channel 3 is QoS parameter 3. Assuming that the second radio access method is LTE and the base station determines that the radio access method for logical channel 3 is NR, when the channel configuration message includes the QoS parameter of each logical channel, the reconfiguration message includes the QoS parameter (i.e., QoS parameter 2) of logical channel 2, the radio access method (NR) corresponding to QoS parameter 2, the QoS parameter (i.e., QoS parameter 3) of logical channel 3, and the radio access method (NR) corresponding to QoS parameter 3.

4) When the channel configuration message includes the QoS of the data in each logical channel, the reconfiguration message includes QoS parameters corresponding to the logical channels and radio access methods corresponding to various QoS parameters.

For example, the access method set corresponding to logical channel 1 is {LTE}, the access method set corresponding to logical channel 2 is {NR}, and the access method set corresponding to logical channel 3 is {LTE, NR}. Assuming that the QoS parameter corresponding to logical channel 1 is QoS parameter 1, the QoS parameter corresponding to logical channel 2 is QoS parameter 2, and the QoS parameter corresponding to logical channel 3 is QoS parameter 3. Assuming that the second radio access method is LTE and the base station determines that the radio access method for logical channel 3 is NR, when the channel configuration message includes the QoS of each logical channel, the reconfiguration message includes QoS parameter 1, the radio access method (LTE) corresponding to QoS parameter 1, QoS parameter 2, the radio access method (NR) corresponding to QoS parameter 2, QoS parameter 3, and the radio access method (NR) corresponding to QoS parameter 3.

In step 505, the base station sends the reconfiguration message to the terminal. Correspondingly, the terminal receives the reconfiguration message.

In embodiments of the present disclosure, the base station can reuse existing signaling to send the reconfiguration message to the terminal. For example, when the second radio access method is LTE, the reconfiguration message may be a Radio Resource Control (RRC) connection reconfiguration message RRCConnectionReconfiguration; or, when the second radio access method is NR, the reconfiguration message is RRC reconfiguration message RRCReconfiguration.

Alternatively, in embodiments of the present disclosure, the base station may send the reconfiguration message to the terminal through independent signaling.

In step 506, the terminal sends the data in the logical channels on the sidelink according to the respective radio access methods corresponding to the logical channels.

In embodiments of the present disclosure, for reconfiguration messages containing different contents, the manner in which the terminal sends data in each logical channel on the sidelink may be different.

1) When the reconfiguration message comprises an identity of a target logical channel and a first radio access method corresponding to the target logical channel, the terminal sends data in the target logical channel on the sidelink according to the first radio access method. When there exists another logical channel, the terminal sends data in the other logical channel on the sidelink according to the second radio access method. The other logical channel is a logical channel other than the target logical channel among the logical channels.

For example, the access method set corresponding to logical channel 1 is {LTE}, the access method set corresponding to logical channel 2 is {NR}, and the access method set corresponding to logical channel 3 is {LTE, NR}. It is assumed that the second radio access method is LTE and the base station determines that the radio access method for logical channel 3 is NR, and the reconfiguration message contains the identity of logical channel 2, the radio access method (NR) corresponding to logical channel 2, the identity of logical channel 3, and the radio access method (NR) corresponding to logical channel 3. When the terminal sends data, the terminal sends the data in logical channel 2 and logical channel 3 on the sidelink using the NR method according to the identities of logical channel 2 and logical channel 3 and the radio access methods corresponding to logical channel 2 and logical channel 3 included in the reconfiguration information. The reconfiguration message does not directly carry the radio access method corresponding to logical channel 1. Under such condition, the terminal sends the data in logical channel 1 on the sidelink using the radio access method (i.e., LTE) used by the channel to send the channel configuration message.

2) When the reconfiguration message includes identities of the logical channels and the radio access methods corresponding to the logical channels, the terminal sends data corresponding to each logical channel on the sidelink according to the radio access method corresponding to the logical channel included in the reconfiguration message.

For example, the access method set corresponding to logical channel 1 is {LTE}, the access method set corresponding to logical channel 2 is {NR}, and the access method set corresponding to logical channel 3 is {LTE, NR}. It is assumed that the second radio access method is LTE, the base station determines that the radio access method for logical channel 3 is NR, and the reconfiguration message includes the identity of logical channel 1, the radio access method (LTE) corresponding to logical channel 1, the identity of logical channel 2, the radio access method (NR) corresponding to logical channel 2, the identity of logical channel 3, and the radio access method (NR) corresponding to logical channel 3. According to the identities of the logical channels and the corresponding radio access methods as indicated in the reconfiguration message, the terminal sends the data in logical channel 1 on the sidelink using the LTE method, and sends the data in logical channel 2 and logical channel 3 on the sidelink using the NR method.

3) When the reconfiguration message includes the target QoS and the third radio access method corresponding to the target QoS, the terminal sends data in a logical channel corresponding to the target QoS among the logical channels on the sidelink according to the third radio access method. When there exists another logical channel, the terminal sends data in the other logical channel on the sidelink according to the second radio access method. The other logical channel is a logical channel other than a logical channel corresponding to the target QoS among the logical channels.

For example, the access method set corresponding to logical channel 1 is {LTE}, the access method set corresponding to logical channel 2 is {NR}, and the access method set corresponding to logical channel 3 is {LTE, NR}. It is assumed that the QoS parameter corresponding to logical channel 1 is QoS parameter 1, the QoS parameter corresponding to logical channel 2 is QoS parameter 2, and the QoS parameter corresponding to logical channel 3 is QoS parameter 3. It is assumed that the second radio access method is LTE, the base station determines that the radio access method for logical channel 3 is NR, and the reconfiguration message includes the QoS parameter (i.e. QoS parameter 2) of logical channel 2, the radio access method (NR) corresponding to QoS parameter 2, the QoS parameter (i.e., QoS parameter 3) of logical channel 3, and the radio access method (NR) corresponding to QoS parameter 3. When sending data, the terminal determines that the corresponding logical channels are logical channel 2 and logical channel 3 according to QoS parameter 2 and QoS parameter 3 included in the reconfiguration message. According to the radio access methods corresponding to QoS parameter 2 and QoS parameter 3 included in the reconfiguration message, the terminal sends the data in logical channel 2 and logical channel 3 on the sidelink using the NR method. In addition, the reconfiguration message does not directly carry the QoS parameter and radio access method corresponding to logical channel 1. Under such condition, the terminal sends the data in logical channel 1 on the sidelink according to the radio access method (i.e., LTE) used to send the channel configuration message.

4) When the reconfiguration message includes the QoS parameters corresponding to the logical channels and the radio access methods corresponding to the QoS parameters, the terminal sends the data in the logical channels corresponding to the QoS parameters on the sidelink according to radio access methods corresponding to the QoS parameters.

For example, the access method set corresponding to logical channel 1 is {LTE}, the access method set corresponding to logical channel 2 is {NR}, and the access method set corresponding to logical channel 3 is {LTE, NR}. It is assumed that the QoS parameter corresponding to logical channel 1 is QoS parameter 1, the QoS parameter corresponding to logical channel 2 is QoS parameter 2, and the QoS parameter corresponding to logical channel 3 is QoS parameter 3. It is assumed that the second radio access method is LTE, the base station determines that the radio access method for logical channel 3 is NR, and the reconfiguration message includes QoS parameter 1, the radio access method (LTE) corresponding to QoS parameter 1, QoS parameter 2, the radio access method (NR) corresponding to QoS parameter 2, QoS parameter 3, and the radio access method (NR) corresponding to QoS parameter 3. According to the QoS parameters and corresponding radio access methods as indicated in the reconfiguration message, the terminal sends the data in the logical channel (i.e., logical channel 1) corresponding to QoS parameter 1 on the sidelink using the LTE method, and sends the data in the logical channels (i.e., logical channel 2 and logical channel 3) corresponding to QoS parameter 2 and QoS parameter 3 on the sidelink using the NR method.

Based on the technical solutions shown in FIG. 5, in an exemplary embodiment, the procedure for the terminal to send data on the sidelink may be as follows:

A) When the terminal (UE) performs data mapping, the initial configuration uses the LTE sidelink to send the data in the logical channels A, B, and C, and A, B and C are identities of the three logical channels.

B) The UE sends a SidelinkUEInformation message to the base station (eNB), which carries a sidelink logical channel list including logical channels A, B, and C, indicates that the PPPPs corresponding to the logical channels are 1, 2, and 3 and the optional sidelink radio access technology types corresponding to the logical channels are: LTE and NR; LTE and NR; LTE.

C) The eNB determines to direct the data of logical channels A and B to NR according to the channel congestion condition, and then sends an RRCConnectionReconfiguration message to the UE, which carries a logical channel list, including logical channels A and B, and indicates that the sidelink radio access type is NR.

D) After the UE receives the RRCConnectionReconfiguration message, the UE sends the data in logical channels A and B through the NR sidelink.

In another exemplary embodiment, the procedure for the terminal to send data on the sidelink may be as follows:

a) When the UE performs data mapping, the initial configuration uses NR sidelink to send data in logical channels A, B, and C.

b) The UE sends a SidelinkUEInformation message to the base station (gNB), which carries a sidelink logical channel list including logical channels A, B, and C, and indicates that the 5QIs corresponding to the logical channels A, B, and C are 1, 2, and 3, and the optional sidelink radio access technology types corresponding to the logical channels A, B, and C are: NR; LTE and NR; LTE and NR.

c) According to the channel congestion condition, the gNB determines to direct the data with 5QIs of 2 and 3 to LTE, and then sends an RRCReconfiguration message to the UE, which carries the 5QI list including 2 and 3, and indicates that the sidelink radio access type is LTE.

d) After the UE receives the RRCReconfiguration message, the terminal sends the data with 5QI of 2 and 3 (that is, the data in logical channels B and C) through the LTE sidelink.

In view of the above, in technical solutions according to embodiments of the present disclosure, a terminal device reports to a base station radio access methods which data in logical channels corresponding to a sidelink can support. According to the reported information, a base station configures a radio access method for the data which support multiple radio access methods, and notifies the terminal of the configuration result by a reconfiguration message. According to the configuration result, the terminal can direct the sidelink data which support multiple radio access methods to the radio access method as configured by the base station to transmit the data. In this way, when performing sidelink data transmission, the radio access methods for the data transmission can be selected.

In addition, in the technical solutions according to embodiments of the present disclosure, the base station can generate the reconfiguration message according to the channel configuration message and the congestion conditions of the sidelink resources corresponding to the radio access methods. In this way, the resources used for transmitting data can be more evenly distributed among the sidelink resources corresponding to the radio access methods, thereby alleviating resource congestion and improving resource utilization.

The following describes device embodiments of the present disclosure, which can be used to implement the method embodiments of the present disclosure. For details that are not disclosed in the device embodiments of the present disclosure, please refer to the method embodiments of the present disclosure.

Figure 6:
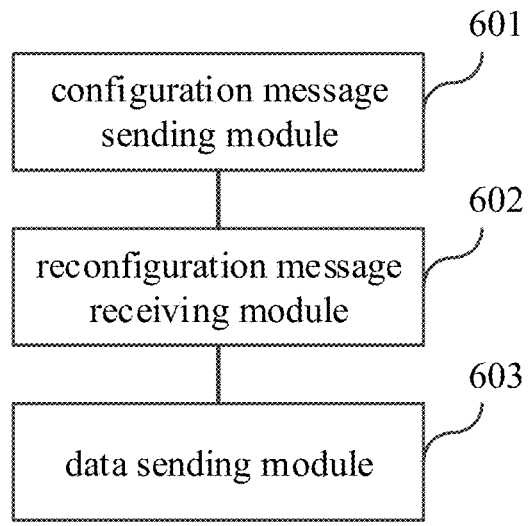
FIG. 6 is a block diagram showing a data transmission device according to an exemplary embodiment.

FIG. 6 is a block diagram showing a data transmission device according to an exemplary embodiment. As shown in FIG. 6, the data transmission device can be implemented as a part of all of a terminal in the implementation environment shown in FIG. 1 through hardware or a combination of software and hardware, to perform the steps which are performed by the terminal in any one of the embodiments described with reference to FIG. 2 or FIG. 3 or FIG. 5. The data transmission device may include a configuration message sending module 601, a reconfiguration message receiving module 602 and a data sending module 603.

The configuration message sending module 601 is configured to send a channel configuration message to a base station. The channel configuration message is used to indicate an access method set for one or more logical channels corresponding to a sidelink in the terminal, and the access method set comprises at least one radio access method supported by data corresponding to the logical channels.

The reconfiguration message receiving module 602 is configured to receive a reconfiguration message sent by the base station. The reconfiguration message is used to indicate radio access methods corresponding to the logical channels.

The data sending module 603 is configured to send the data in the logical channels on the sidelink according to corresponding radio access methods for the logical channels.

According to some embodiments, the channel configuration message comprises the access method set for the logical channels, and the channel configuration message further comprises at least one of identities of the logical channels and Quality of Service (QoS) parameters of the data in the logical channels.

According to some embodiments, when the channel configuration message comprises the identities of the logical channels, the reconfiguration message comprises an identity of a target logical channel and a first radio access method corresponding to the target logical channel; the target logical channel is part or all of the logical channels, and the first radio access method is different from a second radio access method used by the terminal to send the channel configuration message.

According to some embodiments, the data sending module 603 is configured to:

send data in the target logical channel on the sidelink according to the first radio access method.

According to some embodiments, the data sending module 603 is further configured to:

when there exists another logical channel, send data in the other logical channel on the sidelink according to the second radio access method, wherein the other logical channel is a logical channel other than the target logical channel among the logical channels.

According to some embodiments, when the channel configuration message comprises the QoS of the data in the logical channels, the reconfiguration message comprises a target QoS and a third radio access method corresponding to the target QoS; the third radio access method is different from a second radio access method used by the terminal to send the channel configuration message.

According to some embodiments, the data sending module 603 is configured to:

send data in a logical channel corresponding to the target QoS among the logical channels on the sidelink according to the third radio access method.

According to some embodiments, the data sending module 603 is further configured to:

when there exists another logical channel, sending data in the other logical channel on the sidelink according to the second radio access method; the other logical channel is a logical channel other than a logical channel corresponding to the target QoS among the logical channels.

According to some embodiments, when the second radio access method is Long-Term Evolution (LTE), the QoS is PPPP; and when the second radio access method is New Radio (NR), the QoS is 5QI.

According to some embodiments, when the second radio access method is Long-Term Evolution (LTE), the reconfiguration message is RRCConnectionReconfiguration; and when the second radio access method is New Radio (NR), the reconfiguration message is RRCReconfiguration.

According to some embodiments, the channel configuration message is sidelinkUEInformation.

According to some embodiments, the device further includes:
- a mapping module configured to, before the channel configuration message sending module sends the channel configuration message to the base station, map sidelink data to be sent to a first channel according to a radio access method supported by the sidelink data to be sent, wherein the first channel is any one of the logical channels, and when there are at least two pieces of data in the first channel, the at least two pieces of data correspond to at least one same radio access method; and
- a set obtaining module configured to obtain a set formed by the same radio access method corresponding to each piece of data in the first channel as an access method set for the first channel.

In view of the above, in the technical solutions according to embodiments of the present disclosure, a terminal device reports to a base station radio access methods which data in logical channels corresponding to a sidelink can support. According to the reported information, a base station configures a radio access method for the data which support multiple radio access methods, and notifies the terminal of the configuration result by a reconfiguration message. According to the configuration result, the terminal can direct the sidelink data which support multiple radio access methods to the radio access method as configured by the base station to transmit the data. In this way, when performing sidelink data transmission, the radio access methods for the data transmission can be selected.

Figure 7:
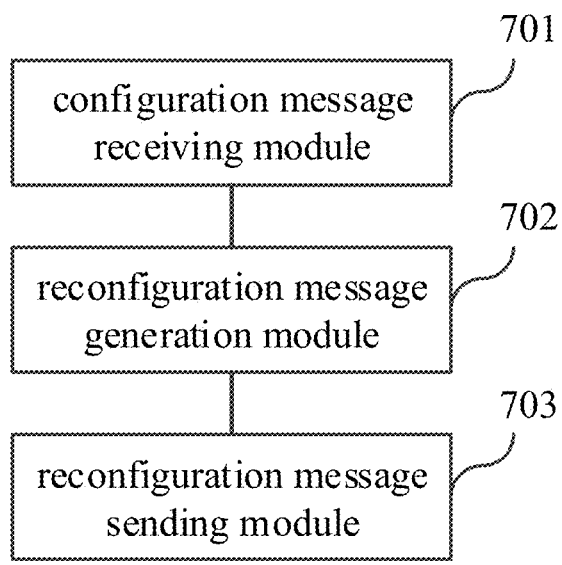
FIG. 7 is a block diagram showing a data transmission device according to an exemplary embodiment.

FIG. 7 is a block diagram showing a data transmission device according to an exemplary embodiment. As shown in FIG. 7, the data transmission device can be implemented as a part of all of a base station in the implementation environment shown in FIG. 1 through hardware or a combination of software and hardware, to perform the steps which are performed by the base station in any one of the embodiments described with reference to FIG. 2 or FIG. 4 or FIG. 5. The data transmission device may include a configuration message receiving module 701, a reconfiguration message generation module 702 and a reconfiguration message sending module 703.

The configuration message receiving module 701 is configured to receive a channel configuration message sent from a terminal. The channel configuration message is used to indicate an access method set for one or more logical channels corresponding to a sidelink in the terminal, and the access method set comprises at least one radio access method supported by data corresponding to the logical channels.

The reconfiguration message generation module 702 configured to generate a reconfiguration message according to the channel configuration message. The reconfiguration message is used to indicate radio access methods corresponding to the logical channels.

The reconfiguration message sending module 703 configured to send the reconfiguration message to the terminal.

According to some embodiments, the reconfiguration message generation module 702 is configured to:
- obtain resource congestion information, wherein the resource congestion information is used to indicate resource congestion statuses for radio access methods corresponding to the sidelink; and
- generate the reconfiguration message according to the resource congestion information and the access method set for the one or more logical channels.

According to some embodiments, the channel configuration message comprises the access method set for the logical channels, and the channel configuration message further comprises at least one of identities of the logical channels and Quality of Service (QoS) parameters of the data in the logical channels.

According to some embodiments, when the channel configuration message comprises the identities of the logical channels, the reconfiguration message comprises an identity of a target logical channel and a first radio access method corresponding to the target logical channel; the target logical channel is part or all of the logical channels, and the first radio access method is different from a second radio access method used by the terminal to send the channel configuration message.

According to some embodiments, when the channel configuration message comprises the QoS of the data in the logical channels, the reconfiguration message comprises a target QoS and a third radio access method corresponding to the target QoS; the third radio access method is different from a second radio access method used by the terminal to send the channel configuration message.

According to some embodiments, when the second radio access method is Long-Term Evolution (LTE), the QoS is PPPP; and
when the second radio access method is New Radio (NR), the QoS is 5QI.

According to some embodiments, when the second radio access method is Long-Term Evolution (LTE), the reconfiguration message is RRCConnectionReconfiguration; and
when the second radio access method is New Radio (NR), the reconfiguration message is RRCReconfiguration.

According to some embodiments, the channel configuration message is sidelinkUEInformation.

In view of the above, in technical solutions according to embodiments of the present disclosure, a terminal device reports to a base station radio access methods which data in logical channels corresponding to a sidelink can support. According to the reported information, a base station configures a radio access method for the data which support multiple radio access methods, and notifies the terminal of the configuration result by a reconfiguration message. According to the configuration result, the terminal can direct the sidelink data which support multiple radio access methods to the radio access method as configured by the base station to transmit the data. In this way, when performing sidelink data transmission, the radio access methods for the data transmission can be selected.

In addition, in the technical solutions according to embodiments of the present disclosure, the base station can generate the reconfiguration message according to the channel configuration message and the congestion conditions of the sidelink resources corresponding to the radio access methods. In this way, the resources used for transmitting data can be more evenly distributed among the sidelink resources corresponding to the radio access methods, thereby alleviating resource congestion and improving resource utilization.

An exemplary embodiment of the present disclosure further provides a data transmission system, including a terminal and a base station.

The terminal includes the data transmission device according to the embodiments described with reference to FIG. 6.

The base station includes the data transmission device according to the embodiments described with reference to FIG. 7.

It should be noted that, when the devices provided in the above embodiments realize their functions, the above division of functional modules is only an example for illustration. In actual applications, the above-mentioned functions can be allocated to different functional modules according to actual needs. That is, the contents and structures of the devices can be divided into different functional modules to complete all or part of the functions described above.

With respect to the devices in the above embodiments, the specific manners for performing operations for individual modules therein have been described in detail in the embodiments regarding the methods, which will not be elaborated herein.

An exemplary embodiment of the present disclosure provides a data transmission device that can implement all or part of the steps performed by a terminal in the embodiments shown in FIG. 2, FIG. 3, or FIG. 5. The data transmission device includes: a processor; and a memory for storing instructions executable by the processor.

The processor is configured to:
send a channel configuration message to a base station, wherein the channel configuration message is used to indicate an access method set for one or more logical channels corresponding to a sidelink in the terminal, and the access method set comprises at least one radio access method supported by data corresponding to the logical channels;
receive a reconfiguration message sent by the base station, wherein the reconfiguration message is used to indicate radio access methods corresponding to the logical channels; and
send the data in the logical channels on the sidelink according to corresponding radio access methods for the logical channels.

According to some embodiments, the channel configuration message comprises the access method set for the logical channels, and the channel configuration message further comprises at least one of identities of the logical channels and Quality of Service (QoS) parameters of the data in the logical channels.

According to some embodiments, when the channel configuration message comprises the identities of the logical channels, the reconfiguration message comprises an identity of a target logical channel and a first radio access method corresponding to the target logical channel; the target logical channel is part or all of the logical channels, and the first radio access method is different from a second radio access method used by the terminal to send the channel configuration message.

According to some embodiments, sending the data in the logical channels on the sidelink according to corresponding radio access methods for the logical channels includes:
sending data in the target logical channel on the sidelink according to the first radio access method.

According to some embodiments, sending the data in the logical channels on the sidelink according to corresponding radio access methods for the logical channels further includes:
when there exists another logical channel, sending data in the other logical channel on the sidelink according to the second radio access method, wherein the other logical channel is a logical channel other than the target logical channel among the logical channels.

According to some embodiments, when the channel configuration message comprises the QoS of the data in the logical channels, the reconfiguration message comprises a target QoS and a third radio access method corresponding to the target QoS; the third radio access method is different from a second radio access method used by the terminal to send the channel configuration message.

According to some embodiments, sending the data in the logical channels on the sidelink according to corresponding radio access methods for the logical channels includes:
sending data in a logical channel corresponding to the target QoS among the logical channels on the sidelink according to the third radio access method.

According to some embodiments, sending the data in the logical channels on the sidelink according to corresponding radio access methods for the logical channels further includes:
when there exists another logical channel, sending data in the other logical channel on the sidelink according to the second radio access method; the other logical channel is a logical channel other than a logical channel corresponding to the target QoS among the logical channels.

According to some embodiments, when the second radio access method is Long-Term Evolution (LTE), the QoS is PPPP; and
when the second radio access method is New Radio (NR), the QoS is 5QI.

According to some embodiments, when the second radio access method is Long-Term Evolution (LTE), the reconfiguration message is RRCConnectionReconfiguration; and
when the second radio access method is New Radio (NR), the reconfiguration message is RRCReconfiguration.

According to some embodiments, the channel configuration message is sidelinkUEInformation.

According to some embodiments, the processor is further configured to:
before the channel configuration message is sent to the base station, map sidelink data to be sent to a first channel according to a radio access method supported by the sidelink data to be sent, wherein the first channel is any one of the logical channels, and when there are at least two pieces of data in the first channel, the at least two pieces of data correspond to at least one same radio access method; and
obtain a set formed by the same radio access method corresponding to each piece of data in the first channel as an access method set for the first channel.

An exemplary embodiment of the present disclosure provides a data transmission device that can implement all or part of the steps performed by a base station in the embodiments shown in FIG. 2, FIG. 4, or FIG. 5. The data transmission device includes: a processor; and a memory for storing instructions executable by the processor.

The processor is configured to:
receive a channel configuration message sent from a terminal, wherein the channel configuration message is used to indicate an access method set for one or more logical channels corresponding to a sidelink in the terminal, and the access method set comprises at least one radio access method supported by data corresponding to the logical channels;
generate a reconfiguration message according to the channel configuration message, wherein the reconfiguration message is used to indicate radio access methods corresponding to the logical channels; and
send the reconfiguration message to the terminal.

According to embodiments, generating the reconfiguration message according to the channel configuration message includes:
    obtaining resource congestion information, wherein the resource congestion information is used to indicate resource congestion statuses for radio access methods corresponding to the sidelink; and
    generating the reconfiguration message according to the resource congestion information and the access method set for the one or more logical channels.

According to embodiments, the channel configuration message comprises the access method set for the logical channels, and the channel configuration message further comprises at least one of identities of the logical channels and Quality of Service (QoS) parameters of the data in the logical channels.

According to embodiments, when the channel configuration message comprises the identities of the logical channels, the reconfiguration message comprises an identity of a target logical channel and a first radio access method corresponding to the target logical channel; the target logical channel is part or all of the logical channels, and the first radio access method is different from a second radio access method used by the terminal to send the channel configuration message.

According to embodiments, when the channel configuration message comprises the QoS of the data in the logical channels, the reconfiguration message comprises a target QoS and a third radio access method corresponding to the target QoS; the third radio access method is different from a second radio access method used by the terminal to send the channel configuration message.

According to embodiments, when the second radio access method is Long-Term Evolution (LTE), the QoS is PPPP; and
    when the second radio access method is New Radio (NR), the QoS is 5QI.

According to embodiments, when the second radio access method is Long-Term Evolution (LTE), the reconfiguration message is RRCConnectionReconfiguration; and
    when the second radio access method is New Radio (NR), the reconfiguration message is RRCReconfiguration.

According to embodiments, the channel configuration message is sidelinkUEInformation.

The foregoing takes a terminal and a base station as examples to introduce the technical solutions according to embodiments of the present disclosure. It can be understood that, in order to implement the above-mentioned functions, the terminal and the base station include hardware structures and/or software modules corresponding to each function. In combination with the modules and algorithm steps of the examples described in the embodiments of the present disclosure, the embodiments of the present disclosure can be implemented in the form of hardware or a combination of hardware and computer software. Whether a certain function is realized by hardware or hardware driven by computer software depends on the specific application and design constraints of the technical solutions. Those skilled in the art can use different methods to implement the described functions for each specific application, but such implementation should not be considered as going beyond the scope of the technical solutions according to embodiments of the present disclosure.

Figure 8:
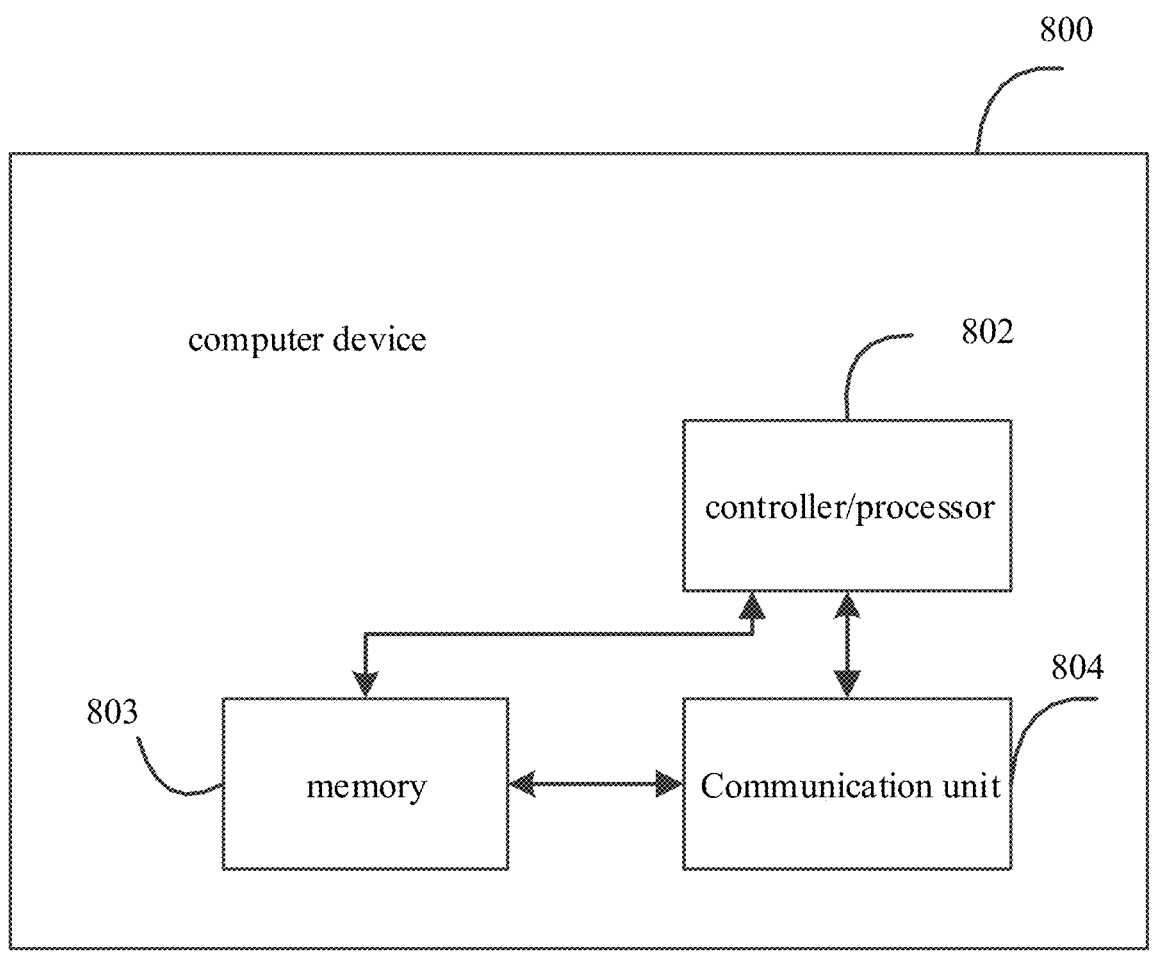
FIG. 8 is a schematic structural diagram of a computer device according to an exemplary embodiment.

FIG. 8 is a schematic structural diagram of a computer device according to an exemplary embodiment. The computer device can be implemented as a terminal or a base station in the system environment shown in FIG. 1.

The computer device 800 includes a communication unit 804 and a processor 802. The processor 802 may be a controller, which is represented as "controller/processor 802" in FIG. 8. The communication unit 804 is used to support the computer device to communicate with other network entities (for example, other computer devices, etc.).

Further, the computer device 800 may further include a memory 803, and the memory 803 is used to store program codes and data of the computer device 800.

It can be understood that FIG. 8 only shows a simplified design of the computer device 800. In practical applications, the computer device 800 may include any number of processors, controllers, memories, communication units, etc., and all computer devices that can implement the embodiments of the present disclosure fall within the protection scope of the embodiments of the present disclosure.

Those skilled in the art should be aware that, in one or more of the foregoing examples, the functions described in embodiments of the present disclosure may be implemented by hardware, software, firmware, or any combination thereof. When implemented by software, these functions can be stored in a computer-readable medium or transmitted as one or more instructions or codes on the computer-readable medium. The computer-readable medium includes a computer storage medium and a communication medium. The communication medium includes any medium that facilitates the transfer of a computer program from one place to another. The storage medium may be any available medium that can be accessed by a general-purpose or special-purpose computer.

An embodiment of the present disclosure also provides a computer storage medium for storing computer software instructions used by the above-mentioned terminal or base station. The computer software instructions include a program designed for performing the above-mentioned data transmission method.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A data transmission method, the method being applied to a terminal and comprising:
    mapping to-be-sent sidelink data to one or more logical channels corresponding to a sidelink, wherein data corresponding to different radio access methods are not mapped to a same logical channel;
    obtaining an access method set for each of the one or more logical channels to which the to-be-sent sidelink data is mapped, wherein the access method set comprises at least one radio access method supported by data corresponding to each of the one or more logical channels;
    sending a channel configuration message to a base station, wherein the channel configuration message is used to indicate the access method set for each of the one or more logical channels corresponding to the sidelink in the terminal, the channel configuration message comprises the access method set for each of the one or more logical channels, and the channel configuration message further comprises identities of the logical channels and Quality of Service (QoS) parameters of the data in the logical channels;

receiving a reconfiguration message sent by the base station, wherein the reconfiguration message is used to indicate radio access methods corresponding to the logical channels, and the reconfiguration message is generated by the base station according to sidelink resource congestion conditions corresponding to the access method set, wherein the reconfiguration message comprises an identity of a target logical channel and a first radio access method corresponding to the target logical channel; the target logical channel is part or all of the one or more logical channels, and the first radio access method is different from a second radio access method used by the terminal to send the channel configuration message; and sending the sidelink data in the one or more logical channels on the sidelink according to corresponding radio access methods for the one or more logical channels as indicated by the reconfiguration message.

2. The method according to claim 1, wherein sending the sidelink data in the one or more logical channels on the sidelink according to corresponding radio access methods for the one or more logical channels comprises:

sending data in the target logical channel on the sidelink according to the first radio access method.

3. The method according to claim 1, wherein sending the sidelink data in the one or more logical channels on the sidelink according to corresponding radio access methods for the one or more logical channels further comprises:

when there exists another logical channel, sending data in the other logical channel on the sidelink according to the second radio access method, wherein the other logical channel is a logical channel other than the target logical channel among the one or more logical channels.

4. The method according to claim 1, wherein the reconfiguration message further comprises a target QoS and a third radio access method corresponding to the target QoS; the third radio access method is different from a second radio access method used by the terminal to send the channel configuration message.

5. The method according to claim 4, wherein sending the data in the logical channels on the sidelink according to corresponding radio access methods for the logical channels comprises:

sending data in a logical channel corresponding to the target QoS among the logical channels on the sidelink according to the third radio access method.

6. The method according to claim 4, wherein sending the sidelink data in the one or more logical channels on the sidelink according to corresponding radio access methods for the one or more logical channels further comprises:

when there exists another logical channel, sending data in the other logical channel on the sidelink according to the second radio access method; the other logical channel is a logical channel other than a logical channel corresponding to the target QoS among the logical channels.

7. The method according to claim 1, wherein:

when the second radio access method is Long-Term Evolution (LTE), the QoS is Prose Per Packet Priority (PPPP); and when the second radio access method is New Radio (NR), the QoS is 5G QoS Identifier (5QI).

8. The method according to claim 1, wherein:

when the second radio access method is Long-Term Evolution (LTE), the reconfiguration message is RRC-ConnectionReconfiguration; and when the second radio access method is New Radio (NR), the reconfiguration message is RRCReconfiguration.

9. The method according to claim 1, wherein before sending the channel configuration message to the base station, the method further comprises:

according to a radio access method supported by to-be-sent sidelink data, mapping the to-be-sent sidelink data to a first channel, wherein the first channel is any one of the one or more logical channels, and when there are at least two pieces of data in the first channel, the at least two pieces of data correspond to at least one same radio access method; and obtaining an access method set formed by a same radio access method corresponding to each piece of data in the first channel as an access method set for the first channel.

10. A data transmission method, the method being applied to a base station and comprising:

receiving a channel configuration message sent from a terminal, wherein the channel configuration message is used to indicate an access method set for each of one or more logical channels corresponding to a sidelink in the terminal, the channel configuration message comprises the access method set for each of the one or more logical channels, and the channel configuration message further comprises identities of the logical channels and Quality of Service (QoS) parameters of the data in the logical channels, and the access method set for each of the one or more logical channels comprises at least one radio access method supported by data corresponding to the each of the one or more logical channels;

generating a reconfiguration message according to the channel configuration message, wherein the reconfiguration message is used to indicate radio access methods corresponding to the logical channels, and the reconfiguration message is generated according to sidelink resource congestion conditions corresponding to the access method set, wherein the reconfiguration message comprises an identity of a target logical channel and a first radio access method corresponding to the target logical channel; the target logical channel is part or all of the one or more logical channels, and the first radio access method is different from a second radio access method used by the terminal to send the channel configuration message; and sending the reconfiguration message to the terminal.

11. The method according to claim 10, wherein generating the reconfiguration message according to the channel configuration message, comprises:

obtaining resource congestion information, wherein the resource congestion information is used to indicate resource congestion conditions for radio access methods corresponding to the sidelink; and generating the reconfiguration message according to the resource congestion information and the access method set for each of the one or more logical channels.

12. The method according to claim 10, wherein the reconfiguration message further comprises a target QoS and a third radio access method corresponding to the target QoS; the third radio access method is different from a second radio access method used by the terminal to send the channel configuration message.

13. The method according to claim 12, wherein:
when the second radio access method is Long-Term Evolution (LTE), the QoS is Prose Per Packet Priority (PPPP); and
when the second radio access method is New Radio (NR), the QoS is 5G QoS Identifier (5QI).

14. The method according to claim 10, wherein:
when the second radio access method is Long-Term Evolution (LTE), the reconfiguration message is RRC-ConnectionReconfiguration; and
when the second radio access method is New Radio (NR), the reconfiguration message is RRCReconfiguration.

15. A data transmission device implementing the method of claim 10, the device being applied to a base station and comprising: a processor; and memory for storing instructions executable by the processor; wherein the processor is configured to perform steps of the method.

16. A data transmission device, the device being applied to a terminal and comprising:
a processor;
memory for storing instructions executable by the processor;
wherein the processor is configured to:
map to-be-sent sidelink data to one or more logical channels corresponding to a sidelink, wherein data corresponding to different radio access methods are not mapped to a same logical channel;
obtain an access method set for each of the one or more logical channels to which the to-be-sent sidelink data is mapped, wherein the access method set comprises at least one radio access method supported by data corresponding to each of the one or more logical channels;
send a channel configuration message to a base station, wherein the channel configuration message is used to indicate the access method set for each of the one or more logical channels corresponding to the sidelink in the terminal, the channel configuration message comprises the access method set for each of the one or more logical channels, and the channel configuration message further comprises identities of the logical channels and Quality of Service (QoS) parameters of the data in the logical channels;
receive a reconfiguration message sent by the base station, wherein the reconfiguration message is used to indicate radio access methods corresponding to the logical channels, and the reconfiguration message is generated by the base station according to sidelink resource congestion conditions corresponding to the access method set, wherein the reconfiguration message comprises an identity of a target logical channel and a first radio access method corresponding to the target logical channel; the target logical channel is part or all of the one or more logical channels, and the first radio access method is different from a second radio access method used by the terminal to send the channel configuration message; and
send the sidelink data in the one or more logical channels on the sidelink according to corresponding radio access methods for the one or more logical channels as indicated by the reconfiguration message.

* * * * *